W. S. PHELPS.
ROTARY STAND PIPE JOINT.
APPLICATION FILED MAY 22, 1909.
943,267.
Patented Dec. 14, 1909.
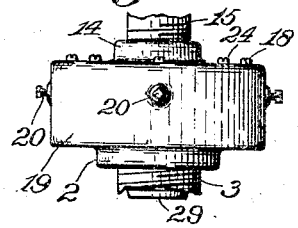
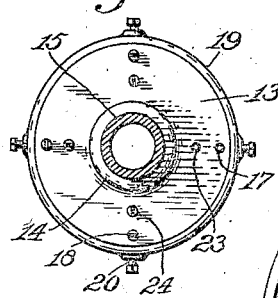
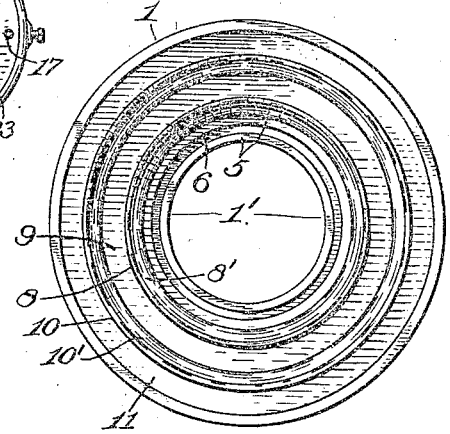
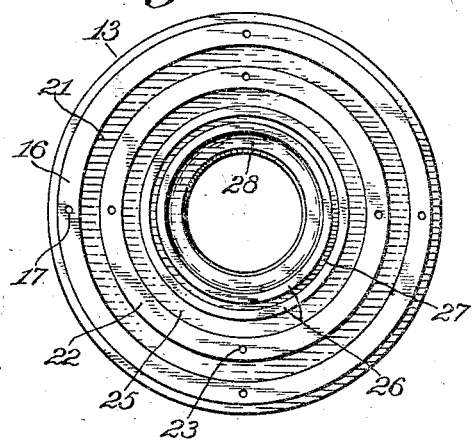
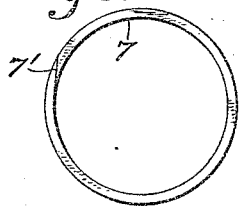
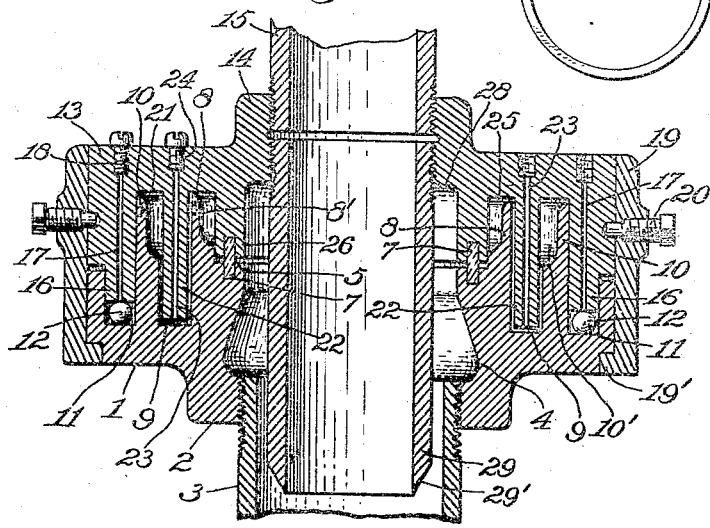
WITNESSES:
J. H. Gardner
K. R. Woddell
INVENTOR:
Walter S. Phelps,
BY
E. T. Silvius,
ATTORNEY.

UNITED STATES PATENT OFFICE.

WALTER SCOTT PHELPS, OF MUNCIE, INDIANA.

ROTARY STAND-PIPE JOINT.

943,267.

Specification of Letters Patent. Patented Dec. 14, 1909.

Application filed May 22, 1909. Serial No. 497,712.

*To all whom it may concern:*

Be it known that I, WALTER SCOTT PHELPS, a citizen of the United States, residing at Muncie, in the county of Delaware and State of Indiana, have invented certain new and useful Improvements in Rotary Stand-Pipe Joints; and I do declare the following to be a full, clear, and exact description of the invention, reference being had to the accompanying drawings, and to the figures of reference marked thereon, which form a part of this specification.

This invention relates to swivel or rotary stand pipes and has reference particularly to a combined pneumatic and liquid packed swivel joint, whereby a stand pipe may be enabled to turn easily with respect to the supporting stationary portion of the pipe without leaking at the joint.

The object of the invention is to provide an improved swivel or rotary joint that will be water tight and operate easily in connection with water cranes or other vertical pipes that require to be turned for any purpose.

A further object is to provide a pipe joint of the above-mentioned character that may be thoroughly lubricated, and without requiring constant attention to keep it in working order, to the end that the joint shall be adapted to be constructed at moderate expense and be reliable, durable and economical in use.

With the above-mentioned and other objects in view the invention consists in a swivel pipe joint having oil chambers and air chambers therein in which air may be trapped and compressed, the joint being provided with ball-bearings for supporting the movable portion of the pipe, and the invention consists further in certain novel features of construction, and in the parts and combinations and arrangements of parts, as hereinafter particularly described and then defined in the appended claims.

Referring to the drawings Figure 1 is an elevation of the improved joint connected with pipe sections; Fig. 2, a top plan thereof; Fig. 3, a top plan of the lower part of the joint; Fig. 4, an inverted plan of the upper part of the joint; Fig. 5, a plan view of a packing ring preferably employed in the joint; Fig. 6, an inverted plan view of the complete joint and a section of pipe connected thereto; and Fig. 7, a vertical central sectional view of the joint and pipe sections.

Similar reference characters in the several figures of the drawings indicate corresponding parts or features of construction referred to herein.

In the drawings, referring to the details of construction, the joint comprises an annular lower part 1 which is designed to be stationary and preferably having an annular projection 2 at the under side thereof, the part being secured to a section 3 of pipe which will be understood as the inlet pipe to the joint; said lower part preferably having a recessed portion 4 therein which is somewhat greater in diameter than the pipe 3. The upper end of the part 1 has a joint face 5 in which is an annular groove 6 to receive a packing ring 7 composed preferably of leather and having a beveled joint 7', the packing ring filling the groove and projecting upward above the joint face 5. The part 1 has an annular portion 8 extending about the packing ring and upward beyond the plane of the joint face a suitable distance, and preferably has a beveled or flared inner face 8', and an annular oil groove 9 is formed in the part 1 of suitable depth at the outer side of the portion 8 for holding oil, another annular portion 10 preferably having a beveled inner side 10' extending upward beyond the plane of the joint face a suitable distance and around the portion 8 beyond the groove 9. Another annular groove 11 is formed in the lower or base part 1 beyond the portion 10 and is adapted to hold oil, the groove 11 having a suitable number of bearing balls 12 therein, the groove serving as a ball race.

The joint comprises also an upper annular part 13 which is designed to move with respect to the lower or base part, and it preferably has an annular projection 14 on the top thereof, a pipe section 15 being secured rigidly to the upper part 13 and will be understood as the swiveled discharge pipe. The under side of the upper part 13 has an annular bearing projection 16 thereon which fits into the groove 11 and bears on the balls 12, whereby the upper part and the movable sections of the pipe are supported so that the pipe may be turned about its axis. The part 13 has a suitable number of oil holes 17 therein that extend to the bottom of the projection 16, the oil holes being normally closed by screw plugs 18. A band 19 extends closely about the upper part 13 and is secured thereto removably by a suitable number of set screws 20, the band extending down against the periphery of the lower part 1 and having an inwardly extending flange 19' engaging the under portion of the lower part 1, preferably extending into a suitable recess in the part 1, so that the two parts are normally held together but permitting the upper part 13 to move freely. At the under side of the part 13 an air space 21 is formed that receives the annular portion 10, and the under side has an annular projection 22 that extends into the groove 9, the projection being adjacent to and extending about the portion 8, the part 13 having a suitable number of oil holes 23 therein that extend to the bottom of the projection 22, the upper ends of the oil holes being normally closed by screw plugs 24. An annular air space 25 is formed adjacent to the projection 22 into which the portion 8 extends. Another annular projection 26 is formed on the under side of the part 13 of suitable length to extend close to the joint face 5 and it has an annular groove 27 therein receiving the packing ring 7. The part 13 has a counter-bore 28 the diameter of which is greater than the external diameter of the pipe section 15, so that an air chamber or space is formed in the part above the air space formed by the recessed portion 4, the air spaces being practically continuous one with the other around a tube 29 which is secured to the upper portion of the part 13 in alinement with the pipe section 15, the tube extending down into the pipe section 3 and having an externally beveled end 29' to readily lead air that may enter with the passing water into the space between the tube and the inlet pipe and up to the air chamber surrounding the tube. The grooves 9 and 11 should be filled with a suitable quantity of oil, leaving air spaces above the oil at opposite sides of the annular portion 22 into which the air which may leak past the joint ring 7 may be compressed to a degree corresponding to the pressure that may be exerted by the flowing water.

It should be understood that the opposing or inner sides of the two parts of the joints obviously should be machine fitted, and while the upper part is supported on the bearing balls 12 it is preferable that the projection 26 be close to the joint face 5 without, however, having bearing contact therewith, and the portions 8 and 10 should be close to the adjacent under side of the upper part 13 without aiding in supporting it.

In practical use the water, or other liquid, flows upward in the pipe 3 and through the tube 29 and out through the pipe 15. The air pent up in the air chamber around the tube will be compressed by the pressure of the flowing liquid so that the liquid usually can not rise in the air chamber sufficiently far to cause leakage past the packing ring 7, although in some cases a small quantity of the air and liquid may escape past the packing ring and enter the air chamber 25 in which the air will be trapped upon the liquid by the oil in the groove 9 and become compressed. The oil will be prevented from being forced out of the groove by air compressed in the chamber 21 where the air is trapped by the oil in the groove 11. It will be seen, therefore, that corrosive action can not occur in the joint because the water is excluded from all metallic movable bearing parts, and the latter are thoroughly lubricated; therefore, the joint may at all times be kept in good working order with but little attention in refilling the oil grooves at long intervals.

Having thus described the invention, what I claim as new is—

1. A rotary pipe joint including an annular lower part having an annular oil-holding groove and also a ball-race therein adapted to hold oil, balls in the ball-race, and an annular upper part having an annular projection thereon extending into the oil-holding groove and also an annular projection extending into the ball-race onto the balls, the upper part having also an annular projection thereon adjacent to the inner side of the innermost wall of the oil-holding groove.

2. A rotary pipe joint including an annular lower part having two annular concentric oil-holding grooves therein, the innermost walls of the grooves being beveled at their extremities, and an annular upper part having an annular projection thereon extending into one of the two oil-holding grooves and also another annular projection extending into the other one of the oil-holding grooves, the upper part having also an annular projection thereon adjacent to the innermost wall of the innermost one of the grooves, the upper part being in proximity to the beveled extremities of the walls of the grooves.

3. A rotary pipe joint including an annular lower part having an annular joint face on its upper end and also an annular portion extending upward beyond the plane of the joint face, the lower part having also an annular groove therein extending downward from the top of the annular portion to hold oil, and an annular upper part having an annular projection thereon extending into the groove and also another annular projection extending opposite and substantially to the joint face, the lower part rotatively supporting the upper part.

4. A rotary pipe joint including an annular lower part having two annular concentric oil-holding grooves therein, the inner sides of the innermost walls of the grooves being beveled at their extremities, an annular upper part having an annular projection thereon extending into one of the two oil-holding grooves and also another annular projection extending into the other one of the oil-holding grooves, the upper part having also an annular projection thereon adjacent to the beveled side of the innermost wall of the innermost one of the grooves, the upper part being in proximity to the beveled extremities of the walls of the grooves, and a tube attached to the inner side of the upper part and extending through the lower part.

5. A rotary pipe joint including an annular lower part having a joint face in which is an annular packing groove, the lower part having also an annular oil-holding groove and also a ball-race therein adapted to hold oil, balls in the ball-race, a packing ring in the packing groove, an annular upper part having an annular projection thereon extending into the oil-holding groove and also an annular projection extending into the ball-race onto the balls, the upper part being provided with an annular projection opposite to said joint face and that has a groove therein receiving said packing ring, and a tube attached to the inner side of the uper part and extending through the lower part.

6. A rotary pipe joint including an annular lower part having an annular oil-holding groove and also a ball-race therein adapted to hold oil, balls in the ball-race, an annular upper part having an annular projection thereon extending into the oil-holding groove and also an annular projection extending into the ball-race onto the balls, the upper part having also an annular projection thereon adjacent to the inner side of the innermost wall of the oil-holding groove, and a band secured to one of the two parts and engaging the other one of the two parts of the joint to prevent separation of the two parts, the two parts being adapted to conduct liquid therethrough.

7. A rotary pipe joint including an annular lower part having an annular joint face on its upper end and also an annular portion extending upward beyond the plane of the joint face, the joint face having an annular packing groove therein, the lower part having also an annular groove therein that is outward beyond the joint face to hold oil, a packing ring in the packing groove, and an annular upper part having an annular projection thereon extending into the outward-arranged groove and also another annular projection extending opposite to the joint face and having a packing groove in its lower end receiving the packing ring, the lower part rotatively supporting the upper part.

8. A rotary pipe joint including an annular lower part having an annular joint face on its upper end and also an annular portion extending upward beyond the plane of the joint face, the lower part having also an annular ball-race therein that is outward beyond the annular portion and adapted to hold oil, balls movable in the ball-race, an annular upper part having an annular projection thereon extending into the ball-race onto the balls to move thereon and also another annular projection extending opposite and substantially to the joint face, and a band secured to one of the two parts and movably engaging the other one of the two parts of the joint to prevent separation of the two parts.

In testimony whereof, I affix my signature in presence of two witnesses.

WALTER SCOTT PHELPS.

Witnesses:
HANNA D. BAYLESS,
F. LEIGHTON BAYLESS.